United States Patent [19]

Ueyama et al.

[11] Patent Number: 5,422,217

[45] Date of Patent: Jun. 6, 1995

[54] RESIN COMPOSITION FOR TONER, METHOD OF PREPARING THE SAME AND TONER

[75] Inventors: Takashi Ueyama; Susumu Tanaka; Yoshiyuki Kosaka; Masazumi Okudo, all of Shiga, Japan

[73] Assignee: Sekisui Kagaku Kogyo Kabushiki Kaisha, Osaka, Japan

[21] Appl. No.: 692

[22] Filed: Jan. 5, 1993

[30] Foreign Application Priority Data

| Jan. 9, 1992 | [JP] | Japan | 4-002076 |
| Apr. 10, 1992 | [JP] | Japan | 4-090804 |
| Oct. 28, 1992 | [JP] | Japan | 4-289923 |
| Nov. 10, 1992 | [JP] | Japan | 4-299725 |

[51] Int. Cl.⁶ .................................................. G03G 9/087
[52] U.S. Cl. .................................................. 430/109; 525/302
[58] Field of Search .......................... 430/109; 525/302

[56] References Cited

U.S. PATENT DOCUMENTS

| 3,965,021 | 6/1976 | Clemens et al. | 430/109 |
| 3,974,078 | 8/1976 | Crystal | 430/109 |
| 4,385,107 | 5/1983 | Tanaka et al. | 430/98 |
| 4,386,147 | 5/1983 | Seimiya et al. | 430/99 |
| 4,486,524 | 12/1984 | Fujisaki et al. | 430/109 |
| 4,499,168 | 2/1985 | Mitsuhashi | 430/99 |
| 4,917,982 | 4/1990 | Tomono et al. | 430/99 |
| 4,921,771 | 5/1990 | Tomono et al. | 430/110 |
| 4,931,375 | 6/1990 | Akimoto et al. | 430/109 |
| 4,968,574 | 11/1990 | Morita et al. | 430/109 |
| 4,988,598 | 1/1991 | Tomono et al. | 430/99 |
| 4,997,739 | 3/1991 | Tomono et al. | 430/110 |
| 5,004,666 | 4/1991 | Tomono et al. | 430/110 |
| 5,023,158 | 6/1991 | Tomono et al. | 430/99 |

FOREIGN PATENT DOCUMENTS

| 2542374 | 9/1975 | Germany . | |
| 57-56850 | 4/1982 | Japan . | |
| 58-59455 | 4/1983 | Japan . | |
| 58-80652 | 5/1983 | Japan . | |
| 63-66563 | 3/1988 | Japan . | |
| 91661 | 3/1990 | Japan | 430/109 |
| 421860 | 1/1992 | Japan . | |

Primary Examiner—Roland Martin
Attorney, Agent, or Firm—Townsend & Banta

[57] ABSTRACT

Disclosed herein is a resin composition for toner mainly composed of a graft polymer which is formed by (a) 90 to 99.9 percent by weight of a copolymer formed by copolymerizing a styrene monomer and (meth)acrylic ester to contain at least 50 percent by weight of the styrene monomer and (b) 0.1 to 10 percent by weight of an ethylene-vinyl acetate copolymer having a saponification value of 10 to 30 and a softening point of 70° to 200° C. This resin composition is prepared by graft-polymerizing the copolymer (a) and the ethylene-vinyl acetate copolymer (b) under presence of a peroxide polymerization initiator. When a polyvalent metal compound (c) is employed, 85 to 99.9 percent by weight of the copolymer (a) and 0.1 to 10 percent by weight of the ethylene-vinyl acetate copolymer (b) are graft-polymerized under presence of 0.01 to 5 percent by weight of the polyvalent metal compound (c) and a peroxide polymerization initiator.

11 Claims, No Drawings

RESIN COMPOSITION FOR TONER, METHOD OF PREPARING THE SAME AND TONER

BACKGROUND OF THE INVENTION

1. Field of the Invention

The present invention relates to a resin composition for toner which is employed for developing an electrostatic charge image in electrophotography or the like, and a method of preparing the same. More particularly, it relates to a resin composition for toner capable of providing toner which is suitably applied to a fixing system using a heating roller in a wide fixing temperature range with excellent offset resistance and blocking resistance, and a method of preparing the same.

2. Description of the Background Art

In general, a dry developing system is employed for developing an electrostatic charge image in electrophotography or the like. Such a dry developing system utilizes a two-component fine-powder developer containing toner, which is prepared by dispersing a colorant such as carbon black in resin, and a carrier of iron powder or glass beads, or a one-component fine-powder developer prepared by magnetizing toner itself.

In this dry developing system, the toner which is charged by friction adheres to an electric latent image provided on a photoreceptor by electric attraction, thereby forming a toner image. Then the toner image formed on the photoreceptor is transferred to paper, and thereafter the as-transferred toner is fixed to the paper by a heating roller whose surface is formed to have mold releasability with respect to the toner, to form a permanent visible image.

When the heating roller is employed as fixing means, the toner must have excellent offset resistance so that the toner will not adhere to the heating roller, excellent fixability so that the toner strongly adheres to the paper, and excellent blocking resistance so that toner particles are hardly flocculated. In particular, the toner must exhibit excellent offset resistance over a wide fixing temperature range.

In order to satisfy the aforementioned requirements, there has been proposed a method of employing a low molecular weight component and a high molecular weight component for expanding the range of molecular weight distribution of a resin composition for toner, as disclosed in Japanese Patent Laying-Open No. 50-134652 (1975), 56-16144 (1981) or 56-158340 (1981). In order to widen the fixing temperature range and improve offset resistance in such a method, however, it is necessary to increase the ratio or molecular weight of the high molecular weight component. This may lead to reduction in fixing strength and crushability of the toner.

Japanese Patent Laying-Open No. 63-66563 (1988) discloses a resin composition for toner which is prepared by mixing a low molecular weight ester compound into resin. According to this method, however, offset resistance of the as-obtained toner is rather reduced although low-temperature fixability thereof is improved.

Further, each of Japanese Patent Publication No. 52-3304 (1977) and Japanese Patent Laying-Open No. 58-59455 (1983) discloses a structure obtained by adding polyolefin wax to a styrene polymer for serving as a mold release agent for suppressing adhesion to a heating roller. Due to inferior compatibility between the polyolefin wax and the styrene polymer, however, the polyolefin wax cannot sufficiently serve as a mold release agent. Further, offset resistance of the as-obtained toner is reduced since the polyolefin wax is easily liberated from the toner. In addition, toner particles are easily flocculated during preservation or copying, due to inferior fluidity of the polyolefin wax.

On the other hand, Japanese Patent Laying-Open No. 56-154741 (1981) relating to toner for a pressure fixing method proposes employment of a graft polymer containing 15 to 70 percent by weight of an ethylene-vinyl acetate copolymer and 85 to 30 percent by weight of a vinyl polymer as a resin composition for toner. However, the pressure fixing method is absolutely different from the heating roller fixing method in conditions such as temperatures and pressures for fixing, with absolutely different performance required for the toner. When the toner disclosed in this literature is applied to the heating roller fixing method, therefore, the toner is deteriorated in crushability, fluidity, blocking resistance and environment dependency due to the high content of the ethylene-vinyl acetate copolymer.

SUMMARY OF THE INVENTION

An object of the present invention is to solve the aforementioned problems of the prior art and provide a resin composition for toner which supplies toner having a wide fixing temperature range with excellent offset resistance and blocking resistance.

A resin composition for toner according to a first aspect of the present invention contains a graft polymer, which is prepared from 90 to 99.9 percent by weight of a copolymer (a) formed by copolymerizing a styrene monomer and (meth)acrylic ester to contain at least 50 percent by weight of the styrene monomer and 0.1 to 10 percent by weight of an ethylene-vinyl acetate copolymer (b) having a saponification value of 10 to 30 and a softening point of 70° to 200° C., as a main component.

A resin composition for toner according to a second aspect of the present invention contains a graft polymer, which is prepared by graft-polymerizing 85 to 99.9 percent by weight of a copolymer (a) formed by copolymerizing a styrene monomer and (meth)acrylic ester to contain at least 50 percent by weight of the styrene monomer and 0.1 to 10 percent by weight of an ethylene-vinyl acetate copolymer (b) having a saponification value of 10 to 30 and a softening point of 70° to 200° C. under presence of 0.01 to 5 percent by weight of a polyvalent metal compound, as a main component.

According to a third aspect of the present invention, the copolymer (a) has a maximum value of at least $4 \times 10^3$ and less than $8 \times 10^4$ in molecular weight distribution measured by gel permeation chromatography (GPC). The ethylene-vinyl acetate copolymer (b) has a maximum value of at least $5 \times 10^3$ and less than $3 \times 10^5$ in molecular weight distribution measured by gel permeation chromatography. Further, the graft polymer of the copolymer (a) and the ethylene-vinyl acetate copolymer (b) has maximum values at least in ranges of at least $4 \times 10^3$ and less than $8 \times 10^4$ and at least $3 \times 10^5$ and less than $2 \times 10^6$ in molecular weight distribution measured by gel permeation chromatography.

In the resin composition for toner according to a fourth aspect of the present invention, the graft polymer of the copolymer (a) and the ethylene-vinyl acetate copolymer (b) has maximum values at least in ranges of at least $4 \times 10^3$ and less than $8 \times 10^4$ and at least $3 \times 10^5$ and less than $2 \times 10^6$ in molecular weight distribution, and the ethylene-vinyl acetate copolymer (b) has a higher content on a high molecular weight side when the resin composition is divided into a low molecular weight side and a high molecular weight side along the molecular weight of a minimum value between the maximum values.

According to the first to fourth aspects of the present invention, the copolymer (a) can be prepared from ionomer resin. In other words, the copolymer (a) may further contain a vinyl monomer having an acidic group as a constituent, so that it is possible to employ a bridged polymer obtained by bridging the copolymer (a) by a polyvalent metal compound to remain unreacted acidic group of the vinyl monomer.

The resin composition for toner according to the first aspect of the present invention can be prepared by graft-polymerizing 90 to 99.9 percent by weight of a copolymer (a) formed by copolymerizing a styrene monomer and (meth)acrylic ester to contain at least 50 percent by weight of the styrene monomer and 0.1 to 10 percent by weight of an ethylene-vinyl acetate copolymer (b) having a saponification value of 10 to 30 and a softening point of 70° to 200° C. under presence of a peroxide polymerization initiator.

In more concrete terms, it is possible to first prepare the ethylene-vinyl acetate copolymer (b), then add the styrene monomer and the (meth)acrylic ester thereto for forming a prescribed amount of the copolymer (a), and graft-polymerize these copolymers under presence of the peroxide polymerization initiator.

The resin composition for toner according to the second aspect of the present invention can be prepared by graft-polymerizing 85 to 99.9 percent by weight of a copolymer (a) formed by copolymerizing a styrene monomer and (meth)acrylic ester to contain at least 50 percent by weight of the styrene monomer and 0.1 to 10 percent by weight of a ethylene-vinyl acetate copolymer (b) having a saponification value of 10 to 30 and a softening point of 70° to 200° C. under presence of 0.01 to 5 percent by weight of a polyvalent metal compound (c) and a peroxide polymerization initiator.

For example, it is possible to first prepare the ethylene-vinyl acetate copolymer (b), then add the styrene monomer and the (meth)acrylic ester thereto for forming a prescribed amount of the copolymer (a), and graft-polymerize these copolymers under presence of the polyvalent metal compound (c) and the peroxide polymerization initiator.

In the resin composition for toner according to the first to fourth aspects of the present invention, the copolymer (a) and the ethylene-vinyl acetate copolymer (b) are graft-polymerized in a constant ratio, whereby the ethylene-vinyl acetate copolymer (b), which has been generally inferior in compatibility with the copolymer (a), is hardly liberated. Thus, the toner obtained through the inventive resin composition for toner has a wide fixing temperature range, and is improved in offset resistance and fluidity.

It is possible to efficiently obtain a resin composition for toner having the aforementioned excellent action by graft-polymerizing the copolymers under presence of the peroxide polymerization initiator.

In addition, it is possible to further improve offset resistance and fluidity of the resin composition by preparing the copolymer (a) from ionomer resin.

According to the second aspect of the present invention, the resin composition contains 0.01 to 5 percent by weight of the polyvalent metal compound (c). If the content of the polyvalent metal compound (c) is smaller than 0.01 percent by weight, no effect of its addition is recognized and it may be impossible to attain sufficient offset resistance, while fixability and fluidity of the toner are deteriorated if the content exceeds 5 percent by weight. The polyvalent metal compound (c), which serves as a catalyst for graft-polymerizing the copolymer (a) and the ethylene-vinyl acetate copolymer (b), is added by a proper method to be present in the system of reaction in graft polymerization. On the other hand, the copolymer (a) preferably contains a vinyl monomer having an acidic group as a constituent, so that the polyvalent metal compound reacts with the acidic group to further improve offset resistance of the toner.

Due to such addition of the polyvalent metal compound (c), the copolymer (a) is further efficiently graft-polymerized with the ethylene-vinyl acetate copolymer (b), thereby providing a resin composition for toner having excellent offset resistance and a wide fixing temperature range.

In the third aspect of the present invention, the copolymer (a) has a maximum value in a range of at least $4 \times 10^3$ and less than $8 \times 10^4$ in a molecular weight distribution curve measured by GPC (gel permeation chromatography). Blocking resistance of the as-obtained toner is deteriorated if the maximum value is less than $4 \times 10^3$, while fixability thereof may be reduced if the maximum value exceeds $8 \times 10^4$.

The copolymer (b) has a maximum value in a range of $5 \times 10^3$ and less than $3 \times 10^5$ in a molecular weight distribution curve measured by GPC. Blocking resistance of the as-obtained toner may be deteriorated if the maximum value is less than $5 \times 10^3$, while fixability thereof may be reduced if the maximum value exceeds of $3 \times 10^5$.

According to the third aspect of the present invention, further, the resin composition for toner has maximum values at least in ranges of at least $4 \times 10^3$ and less than $8 \times 10^4$ and at least $3 \times 10^5$ and less than $2 \times 10^6$ respectively in molecular weight distribution measured by GPC. Blocking resistance of the as-obtained toner may be deteriorated if one of the maximum values is less than $4 \times 10^3$, while fixability thereof may be reduced if this maximum value exceeds $8 \times 10^4$.

Further, offset resistance may be deteriorated if the other maximum value is less than $3 \times 10^5$, while fixability may be reduced if this maximum value exceeds $2 \times 10^6$.

The resin composition for toner according to the third aspect of the present invention has maximum values at least in the aforementioned molecular weight ranges respectively, whereby blocking resistance and offset resistance are improved and a wide fixing temperature range is implemented when the same is applied to toner.

The resin composition for toner according to the fourth aspect of the present invention has maximum values at least in ranges of at least $4 \times 10^3$ and less than $8 \times 10^4$ and at least $3 \times 10^5$ and less than $2 \times 10^6$ in molecular weight distribution measured by GPC. According to the fourth aspect of the present invention, further, the ethylene-vinyl acetate copolymer (b) has a higher content on a high molecular weight side when the resin composition is divided into a low molecular weight side and a high molecular weight side along the molecular weight showing a minimum value between the maximum values. This is because blocking resistance, fluidity and dispersibility of the as-obtained toner may be deteriorated if the ethylene-vinyl acetate copolymer (b) has a higher content on the low molecular weight side than the high molecular weight side. If a plurality of minimum values are present between the maximum values, the resin composition may be divided into a low molecular weight side and a high molecular weight side along the minimum value having the minimum peak height.

DETAILED DESCRIPTION OF THE INVENTION

The resin composition for toner, the method of preparing the same and the toner according to the present invention are now described in detail.

Copolymer (a)

According to the present invention, the styrene monomer for serving as a constituent of the copolymer (a) can be prepared from styrene, o-methylstyrene, m-methylstyrene, p-methylstyrene, α-methylstyrene, p-ethylstyrene, 2,4-dimethylstyrene, p-n-butylstyrene, p-ter-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene or 3,4-dichlorostyrene. Among these materials, styrene is preferably employed.

The (meth)acrylic ester for serving as another constituent of the copolymer (a) can be prepared from methyl (meth)acrylate, ethyl (meth)acrylate, propyl (meth)acrylate, n-butyl (meth)acrylate, isobutyl (meth-)acrylate, n-octyl (meth)acrylate, dodecyl (meth)acrylate, 2-ethylhexyl (meth)acrylate, lauryl (meth)acrylate, stearyl (meth)acrylate, dimethylaminoethyl (meth)acrylate, diethylaminoethyl (meth)acrylate, or methyl α-chloroacrylate. Throughout the specification, the terms "(meth)acrylic" and "(meth)acrylate" indicate "acrylic" and "methacrylic", and "acrylate" and "methacrylate", respectively.

Among these materials, methyl methacrylate, n-butyl (meth)acrylate and 2-ethylhexyl acrylate are particularly preferable.

Further, it is possible to employ a vinyl monomer having an acidic group. While the acidic group may be prepared from carboxylic acid, sulfonic acid, sulfinic acid, phosphonic acid or boric acid, carboxylic acid is preferably employed in consideration of easiness in copolymerization. Examples of a vinyl monomer containing carboxylic acid are (meth)acrylic acid related compounds such as (meth)acrylic acid, α-ethyl acrylate or crotonic acid and an α- or β-alkyl derivative thereof, unsaturated dicarboxylic acid such as fumaric acid, maleic acid, citraconic acid or itaconic acid, and an unsaturated dicarboxylic monoester derivative such as monoacryloyloxyethylester succinate, monomethacryloyloxyethylester succinate, monoacryloyloxyethylester phthalate or monomethacryloyloxyethylester phthalate.

According to the present invention, the copolymer (a) must contain the styrene monomer in a copolymerization ratio of at least 50 percent by weight. If this ratio is less than 50 percent by weight, the finally obtained toner is reduced in crushability when the copolymer (a) is graft-polymerized with the copolymer (b) to prepare a resin composition for toner.

Copolymer (b)

The aforementioned copolymer (b) employed in the present invention must be an ethylene-vinyl acetate copolymer which has a saponification value of 10 to 30 and a softening point, measured by a ring and ball method of JIS K-2531, of 70° to 200° C.

If the saponification value is less than 10, this copolymer (b) is so insufficient in compatibility or insufficiently graft-polymerized with the copolymer (a) that sufficient offset resistance cannot be attained, while the copolymer (b) is easily liberated from the resin composition for toner. If the saponification value exceeds 30, on the other hand, the glass transition point of the copolymer (b) is so reduced that the resin composition is easily blocked and its fluidity is reduced. Further, it is so difficult to control graft polymerization that the composition may be gelled.

If the softening point is less than 70° C., the glass transition point of the copolymer (b) is so reduced that the resin composition for toner obtained by graft-polymerizing this copolymer (b) with the copolymer (a) has such a low glass transition point that the finally obtained toner is easily blocked. If the softening point exceeds 200° C., on the other hand, melt viscosity of the copolymer (b) is so increased that the as-obtained toner cannot be fixed at a low temperature and has a narrow fixing temperature.

Polyvalent Metal Compound (c)

Examples of the polyvalent metal compound (c) employed in the present invention are fluoride, chloride, chlorate, bromide, iodide, oxide, hydroxide, sulfide, subsulfide, sulfate, selenide, telluride, nitride, nitrate, phosphide, phosphinate, phosphate, carbonate, orthosilicate, acetate, an alkyl metal compound such as methylide or ethylide, alkylate, aromate, dicarboxylate, an alkoxy metal compound etc. of a polyvalent metal such as Cu, Ag, Be, Mg, Ca, Sr, Ba, Zn, Cd, Al, Ti, Ge, Sn, V, Cr, Mo, Mn, Fe, Co or Ni. Among these materials, acetate, oxide, alkyl metal compound and alkylate are preferable.

Graft Polymerization Ratio of Copolymer (a) to Copolymer (b)

In the resin composition for toner according to the present invention, the graft polymer obtained by graft-polymerizing the copolymers (a) and (b) must contain 0.1 to 10 percent by weight of the copolymer (b). If the content of the copolymer (b) is less than 0.1 percent by weight, the resin composition for toner exhibits merely insufficient fixability and offset resistance at a low temperature. If the content of the copolymer (b) exceeds 10 percent by weight, on the other hand, the finally obtained toner is deteriorated in crushability, fluidity, blocking resistance and environment dependency.

Other Components added to Resin Composition for Toner

The inventive resin composition for toner, which is prepared from the aforementioned specific graft polymer, may further contain small amounts of other components in a range not inhibiting the object of the present invention. For example, the copolymer (a) may be copolymerized with vinyl acetate, vinyl chloride or ethylene, while a single polymer may be added to the copolymer (a) or polyester resin, epoxy resin or the like may be added to the resin composition for toner.

Toner

Toner can be prepared by adding a colorant to the resin composition for toner. This colorant can be prepared from a proper agent which is generally employed for toner fixed by a heating roller. This toner is mainly prepared by a method of adding a colorant, a charge controller etc. to the resin composition for toner, kneading the same in a heated/melted state, and crushing and graining the kneaded substance after cooling the same.

Method of Preparing Resin Composition for Toner

The copolymers (a) and (b) can be prepared by various polymerization methods such as suspension polymerization, emulsion polymerization, solution polymerization, bulk polymerization and the like, for example.

The copolymers (a) and (b) are preferably graft-polymerized by a method of polymerizing the styrene monomer and the (meth)acrylic ester under presence of the copolymer (b). The peroxide polymerization initiator is employed as a grafting catalyst.

Peroxide Polymerization Initiator

Examples of the peroxide polymerization initiator are ketone peroxide such as methyl ethyl ketone peroxide, methyl isobutyl ketone peroxide, cyclohexanone peroxide, methyl cyclohexanone peroxide or acetylacetone peroxide, peroxyketal such as 1,1-bis(t-butyl peroxy)3,3,5-trimethyl cyclohexane, 1,1-bis(t-butyl peroxy)-cyclohexane or 2,2-bis(t-butyl peroxy)butane, hydroperoxide such as t-butyl hydroperoxide, cumene hydroperoxide or 1,1,3,3-tetramethyl butyl hydroperoxide, dialkyl peroxide such as di-t-butyl peroxide, dicumyl peroxide or t-butylcumyl peroxide, diacyl peroxide such as acetyl peroxide, benzoyl peroxide or isobutylyl peroxide, peroxy carbonate such as diisopropyl peroxy dicarbonate or di-2-ethylhexyl peroxy dicarbonate, peroxy ester such as t-butyl peroxy acetate, t-butyl peroxy 2-ethylhexanoate or di-t-butyl peroxide. Among these materials, preferably employed is di-t-butyl peroxide, t-butylcumyl peroxide, t-butyl peroxy 2-ethyl hexanoate or t-butyl peroxy isopropyl carbonate having the following structure:

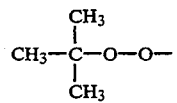

(I)

When the aforementioned peroxide polymerization initiator is employed, this polymerization initiator is first decomposed upon heating of the composition in polymerization, to generate radicals (t-butoxy radicals). These radicals abstract hydrogen from the ethylene-vinyl acetate copolymer and a solvent or the like, whereby radicals are generated in the abstracted portions to start polymerization. Consequently, the vinyl monomer is grafted in the ethylene-vinyl acetate copolymer. Hydrogen abstractability of the polymerization initiator is varied with its type (structure). For example, azobisisobutylonitrile is hardly provided with such hydrogen abstractability, while benzoyl peroxide has excellent hydrogen abstractability. However, a peroxide polymerization initiator having the structure expressed in the aforementioned formula (I) is superior in hydrogen abstractability to benzoyl peroxide. Thus, hydrogen is efficiently abstracted from the ethylene-vinyl acetate copolymer by the as-generated t-butoxy radicals, to efficiently form a graft polymer. Such t-butoxy radicals are present in a large amount in polymerization, whereby the polymerization is stopped with relatively short graft chains. As the result, the graft polymer is prevented from excess increase of the softening point. Thus, it is possible to prepare a resin composition for toner, which provides toner having a wide fixing temperature range and excellent offset resistance.

DESCRIPTION OF THE PREFERRED EMBODIMENTS

Examples according to the first aspect of the present invention are now described. In the following description, the term "part" indicates that by weight unless otherwise stated.

EXAMPLE 1-1

7 parts of an ethylene-vinyl acetate copolymer having a saponification value of 28 and a softening point of 150° C. and 50 parts of toluene were introduced into a flask, and dissolved. Gaseous nitrogen was substituted for the air in the flask, and the solution contained in this flask was heated to the boiling point of the toluene. When the toluene was refluxed, this solution was stirred and a mixed solution of 70 parts of styrene, 9 parts of methyl methacrylate, 14 parts of n-butyl acrylate and 5 parts of t-butyl peroxy 2-ethyl hexanoate (polymerization initiator) was dropped therein for 2.5 hours, to perform solution polymerization.

After termination of the dropping, the solution was stirred under the reflux of the toluene and aged for 2 hours. Thereafter the temperature in this flask was gradually increased to 180° C., and the toluene was desolvented under decompression to obtain a resin composition. The as-obtained resin composition was cooled and thereafter crushed to prepare a resin composition for toner.

4 parts of carbon black (MA-100 (trade name) by Mitsubishi Chemical Ltd.) was added to 100 parts of the aforementioned resin composition for toner, to be melted and mixed with the same. Thereafter the mixture was cooled, then roughly crushed and further finely crushed with a jet mill, to prepare toner powder of 13 to 15 μm in mean particle size.

10 g of the as-obtained toner was measured and introduced into a sample bottle of 100 ml, which in turn was left in a thermostat of 50° C. for 16 hours. Thereafter presence/absence of particle coalescence was observed to evaluate blocking resistance. As the result, excellent blocking resistance was recognized.

The aforementioned toner was applied to an electrophotographic copying machine (modified machine of U-Bix (trade name) by Konica Corporation), and its fixing temperature range was measured. This electrophotographic copying machine was modified to be capable of changing the set temperature of its heating roller for fixing. This set temperature was changed for evaluating the fixing temperature range, in which the toner was fixed to paper in an excellent state with no offset phenomenon. The as-evaluated fixing temperature range was 160° to 240° C. Thus, it was recognized that this toner exhibited excellent fixability over a wide temperature range.

EXAMPLE 1-2

1 part of an ethylene-vinyl acetate copolymer having a saponification value of 28 and a softening point of 100° C., 50 parts of toluene and 3.5 parts of di-t-butyl peroxide (polymerization initiator) were introduced into a flask, and dissolved. Gaseous nitrogen was substituted for the air in this flask, and the solution was heated to the boiling point of the toluene. When the toluene was refluxed, this solution was stirred and a mixed solution of 69 parts of styrene, 15 parts of methyl methacrylate and 15 parts of 2-ethylhexyl acrylate was dropped therein for 2.5 hours, to perform solution polymerization.

After termination of the dropping, the as-obtained polymer was aged, desolvented, cooled and crushed to obtain a resin composition for toner, similarly to Example 1-1.

This resin composition for toner was employed to prepare toner in a similar manner to Example 1-1, and the toner was evaluated also similarly to Example 1-1.

As the result, it was recognized that the toner obtained in Example 1-2 also exhibited excellent blocking resistance and a wide fixing temperature range of 160° to 230° C., with excellent fixability over such a wide temperature range.

EXAMPLE 1-3

3 parts of an ethylene-vinyl acetate copolymer having a saponification value of 12 and a softening point of 80° C. and 50 parts of toluene were introduced into a flask, and dissolved. Thereafter the solution was treated in a similar manner to Example 1-1. When the toluene was refluxed, the solution was stirred and a mixed solution of 87 parts of styrene, 10 parts of n-butyl acrylate and 4 parts of t-butylcumyl peroxide (polymerization initiator) was dropped therein for 2.5 hours, to perform solution polymerization. After termination of the dropping, a resin composition for toner was obtained similarly to Example 1-1, and toner was prepared also similarly to Example 1-1, to be subjected to evaluation.

As the result, it was recognized that the as-obtained toner exhibited excellent blocking resistance and a wide fixing temperature range of 150° to 230° C., with excellent fixability in this temperature range.

EXAMPLE 1-4

9 parts of an ethylene-vinyl acetate copolymer having a saponification value of 25 and a softening point of 135° C. and 50 parts of toluene were treated in a similar manner to Example 1-1. When the toluene was refluxed, the solution was stirred and a mixed solution of 68 parts of styrene, 9 parts of methyl methacrylate, 14 parts of n-butyl acrylate and 4.5 parts of benzoyl peroxide (polymerization initiator) was dropped therein for 2.5 hours to perform solution polymerization, thereby obtaining a resin composition for toner similarly to Example 1-1. Toner was prepared from the as-obtained resin composition for toner in a similar manner to Example 1-1, to be subjected to evaluation.

As the result, it was recognized that the as-obtained toner exhibited excellent blocking resistance and a wide fixing temperature range of 160° to 240° C., with excellent fixability in this temperature range.

EXAMPLE 1-5

4 parts of an ethylene-vinyl acetate copolymer having a saponification value of 28 and a softening point of 185° C. and 50 parts of toluene were treated similarly to Example 1-1. When the toluene was refluxed, the solution was stirred and a mixed solution of 62 parts of styrene, 15 parts of methyl methacrylate, 19 parts of n-butyl acrylate and 4 parts of di-t-butyl peroxide (polymerization initiator) was dropped therein for 2.5 hours, to perform solution polymerization. Thereafter a resin composition for toner was obtained in a similar manner to Example 1-1. Toner was prepared from the as-obtained resin composition for toner also similarly to Example 1-1, to be subjected to evaluation.

As the result, it was recognized that the as-obtained toner exhibited excellent blocking resistance and a wide fixing temperature range of 170° to 240°, with excellent fixability in this temperature range.

Comparative Example 1-1

Toner was prepared absolutely in a similar manner to Example 1-1 except that no ethylene-vinyl acetate copolymer was employed, and subjected to evaluation.

As the result, it was recognized that this toner was considerably inferior to that of Example 1-1 with a narrow fixing temperature range of 170° to 210° C., although excellent blocking resistance was attained.

Comparative Example 1-2

Toner was prepared absolutely in a similar manner to Example 1-1, except that 5 parts of t-butyl peroxy 2-ethylhexanoate for serving as a polymerization initiator was replaced by 5 parts of azobisisobutylonitrile, and subjected to evaluation.

As the result, it was recognized that this toner was superior to that of Comparative Example 1-1 but inferior to that of Example 1-1 with a narrow fixing temperature range of 160° to 220° C., although excellent blocking resistance was attained.

Molecular weight distributions of the resin compositions for toner according to Example 1-1 and Comparative Example 1-2 were measured by GPC (gel permeation chromatography). As the result, Example 1-1 containing the t-butyl peroxy 2-ethylhexanoate having a strong grafting action exhibited a wider distribution of the high molecular weight component in a higher ratio as compared with Comparative Example 1-2 containing the azobisisobutylonitrile having substantially no grafting action. Thus, it was recognized that a vinyl polymer was further effectively grafted in the ethylene-vinyl acetate copolymer in Example 1-1.

Comparative Example 1-3

Toner was prepared absolutely in a similar manner to Example 1-1, except that the content of the ethylene-vinyl acetate copolymer was increased to 20 parts, and subjected to evaluation.

As the result, the toner exhibited coalescence, with inferior blocking resistance. Further, this toner had a narrow fixing temperature range of 160° to 200° C. Thus, Comparative Example 1-3 was inferior in both of blocking resistance and fixing temperature range to Example 1-1.

Comparative Example 1-4

Toner was prepared absolutely in a similar manner to Example 1-3, except that an ethylene-vinyl acetate copolymer having a saponification value of 40 and a softening point 220° C. was employed, and subjected to evaluation.

As the result, this toner exhibited particle coalescence, with inferior blocking resistance. Further, this toner had a fixing temperature range of 180° to 230° C. Namely, the lower limit fixing temperature was too high although the upper limit fixing temperature (minimum temperature causing an offset phenomenon) was satisfactory. Thus, Comparative Example 1-4 was recognized to be inferior to Example 1-3.

Comparative Example 1-5

Toner was prepared absolutely in a similar manner to Example 1-3 except that an ethylene-vinyl acetate copolymer having a saponification value of 5 and a softening point of 60° C. was employed, and subjected to evaluation.

As the result, the toner exhibited particle coalescence, with inferior blocking resistance. Further, this toner had a narrow fixing temperature range of 160° to 200° C. Thus, Comparative Example 1-5 was inferior in both of blocking resistance and fixing temperature range to Example 1-3.

Examples according to the second aspect of the present invention are now described.

EXAMPLE 2-1

6 parts of an ethylene-vinyl acetate copolymer having a saponification value of 25 and a softening point of 135° C., 1 part of dibutyltin oxide and 50 parts of toluene were introduced into a flask, and dissolved. Gaseous nitrogen was substituted for the air in the flask, and the solution contained in this flask was heated to the boiling point of the toluene. When the toluene was refluxed, this solution was stirred and a mixed solution of 70 parts of styrene, 15 parts of methyl methacrylate, 15 parts of n-butyl acrylate and 6 parts of 1-butylperoxy 2-ethylhexanoate (polymerization initiator) was dropped therein for 2.5 hours, to perform solution polymerization.

After termination of the dropping, the mixture was stirred under the reflux of the toluene, and aged for two hours. Thereafter the temperature in the flask was gradually increased to 180° C. and the toluene was desolvented under decompression, to obtain a resin composition. The as-obtained resin composition was cooled and crushed to prepare a resin composition for toner.

4 parts of carbon black (MA-100 (trade name) by Mitsubishi Chemical Ltd.) was added to 100 parts of the aforementioned resin composition for toner and mixed with the same. Thereafter the mixture was cooled, thereafter roughly crushed and then finely crushed with a jet mill, to prepare toner powder of 13 to 15 μm in mean particle size.

10 g of the as-obtained toner was measured and introduced into a sample bottle of 100 ml, which in turn was left in a thermostat of 50° C. for 16 hours. Thereafter presence/absence of particle coalescence was observed to evaluate blocking resistance. As the result, excellent blocking resistance was confirmed.

This toner was applied to an electrophotographic copying machine (modified machine of U-Bix (trade name) by Konica Corporation) and its fixing temperature range was measured. This electrophotographic copying machine was modified to be capable of changing the set temperature of its heating roller for fixing. This set temperature was changed for evaluating the fixing temperature range, in which the toner was fixed to paper in an excellent state with no offset phenomenon. The as-evaluated fixing temperature range was 160° to 230° C. Thus, it was recognized that this toner exhibited excellent fixability over a wide temperature range.

EXAMPLE 2-2

1 part of an ethylene-vinyl acetate copolymer having a saponification value of 25 and a softening point of 135° C., 0.5 parts of zinc acetate, 50 parts of toluene and 3.5 parts of di-t-butyl peroxide (polymerization initiator) were introduced into a flask, and dissolved. Gaseous nitrogen was substituted for the air in this flask, and the solution was heated to the boiling point of the toluene. When the toluene was refluxed, this solution was stirred and a mixed solution of 75 parts of styrene, 10 parts of methyl methacrylate. 10 parts of 2-ethylhexyl acrylate and 5 parts of monoacryloyloxyethylester succinate was dropped therein for 2.5 hours, to perform solution polymerization.

After termination of the dropping, the mixture was aged, desolvented, cooled and crushed to obtain a resin composition for toner.

Toner was prepared from this resin composition similarly to Example 2-1, and subjected to evaluation also similarly to Example 2-1.

As the result, it was recognized that the toner obtained in Example 2-2 also exhibited excellent blocking resistance and a wide fixing temperature range of 160° to 240° C., with excellent fixability over such a wide temperature range.

EXAMPLE 2-3

3 parts of an ethylene-vinyl acetate copolymer having a saponification value of 12 and a softening point of 80° C., 2 parts of magnesium laurylate and 50 parts of toluene were introduced into a flask, and dissolved. Thereafter the solution was treated similarly to Example 2-1. When the toluene was refluxed, this solution was stirred and a mixed solution of 85 parts of styrene, 10 parts of n-butyl acrylate, 5 parts of monomethacryloyloxyethylester succinate and 4 parts of t-butylcumyl peroxide (polymerization initiator) was dropped therein for 2.5 hours, to perform solution polymerization. After termination of the dropping, a resin composition for toner was obtained similarly to Example 2-1, and toner was prepared and evaluated also similarly to Example 2-1.

As the result, it was recognized that the as-obtained toner had excellent blocking resistance and a wide fixing temperature range of 160° to 240° C., with excellent fixability over this wide temperature range.

EXAMPLE 2-4

9 parts of an ethylene-vinyl acetate copolymer having a saponification value of 28 and a softening point of 150° C., 0.1 parts of magnesium acetate and 50 parts of toluene were treated similarly to Example 2-1. When the toluene was refluxed, this solution was stirred and a mixed solution of 66 parts of styrene, 10 parts of methyl methacrylate, 20 parts of n-butyl acrylate, 4 parts of acrylic acid and 6 parts of benzoyl peroxide (polymerization initiator) was dropped therein for 2.5 hours to perform solution polymerization, thereby obtaining a resin composition for toner similarly to Example 2-1. Toner was prepared from the as-obtained resin composition for toner and evaluated, also similarly to Example 2-1.

As the result, it was recognized that the toner had excellent blocking resistance and a wide fixing temperature range of 160° to 240° C., with excellent fixability over this temperature range.

EXAMPLE 2-5

5 parts of an ethylene-vinyl acetate copolymer having a saponification value of 28 and a softening point of 185° C., 4 parts of dibutyltin oxide and 50 parts of toluene were treated similarly to Example 2-1. When the toluene was refluxed, this solution was stirred and a mixed solution of 65 parts of styrene, 15 parts of methyl methacrylate, 20 parts of n-butyl acrylate and 4 parts of di-t-butyl peroxide (polymerization initiator) was dropped therein for 2.5 hours, to perform solution polymerization. Thereafter a resin composition for toner was obtained similarly to Example 2-1. Further, toner was prepared from the as-obtained resin composition and evaluated also similarly to Example 2-1.

As the result, it was recognized that this toner exhibited excellent blocking resistance and a wide fixing temperature range of 170° to 240° C., with excellent fixability over this temperature range.

Comparative Example 2-1

Toner was prepared and evaluated absolutely in a similar manner to Example 2-1, except that no ethylene-vinyl acetate copolymer was employed.

As the result, it was recognized that the as-obtained toner was considerably inferior to that of Example 2-1 with a narrow fixing temperature range of 170° to 210° C., although its blocking resistance was excellent.

Comparative Example 2-2

Toner was prepared and evaluated absolutely in a similar manner to Example 2-1, except that 6 parts of azobisisobutylonitrile was employed as a polymerization initiator in place of 6 parts of t-butyl peroxy 2-ethyl hexanoate.

As the result, it was recognized that this toner was superior to that of Comparative Example 2-1 but inferior to that of Example 2-1 with a fixing temperature range of 160° to 220° C., although its blocking resistance was excellent.

Further, molecular weight distributions of the resin compositions for toner according to Example 2-1 and Comparative Example 2-2 were measured by GPC (gel permeation chromatography). As the result, the resin composition of Example 2-1 containing the t-butyl peroxy 2-ethyl hexanoate having a strong grafting action exhibited a wider distribution of the high molecular weight component in a higher ratio as compared with Comparative Example 2-2 containing the azobisisobutylonitrile having substantially no grafting action. Thus, it was recognized that a vinyl copolymer was further effectively grafted in the ethylene-vinyl acetate copolymer in the resin composition of Example 2-1.

Comparative Example 2-3

Toner was prepared and evaluated absolutely in a similar manner to Example 2-1, except that the amount of the ethylene-vinyl acetate copolymer was increased to 20 parts.

As the result, the as-obtained toner exhibited coalescence, with inferior blocking resistance. Further, this toner had a narrow fixing temperature range of 160° to 200° C. Thus, Comparative Example 2-3 was inferior in both of blocking resistance and fixing temperature range to Example 2-1.

Comparative Example 2-4

Toner was prepared and evaluated similarly to Example 2-3, except that an ethylene-vinyl acetate copolymer having a saponification value of 40 and a softening point of 220° C. was employed.

As the result, the as-obtained toner exhibited coalescence, with inferior blocking resistance. Further, this toner had a fixing temperature range of 180° to 240° C. Namely, the lower limit fixing temperature was too high although the upper limit fixing temperature (minimum temperature causing an offset phenomenon) was satisfactory. Thus, Comparative Example 2-4 was recognized to be inferior to Example 2-3.

Comparative Example 2-5

Toner was prepared and evaluated absolutely in a similar manner to Example 2-3, except that an ethylene-vinyl acetate copolymer having a saponification value of 5 and a softening point of 60° C. was employed.

As the result, the as-obtained toner exhibited particle coalescence, with inferior blocking resistance. Further, this toner had a narrow fixing temperature range of 160° to 210° C. Thus, Comparative Example 2-5 was inferior in both of blocking resistance and fixing temperature range to Example 2-3.

Comparative Example 2-6

Toner was prepared and evaluated absolutely in a similar manner to Example 2-2, except that no zinc acetate was employed.

As the result, it was recognized that this toner was slightly inferior to that of Example 2-2 with a fixing temperature range of 160° to 230° C., although excellent blocking resistance was attained.

Examples according to the third aspect of the present invention are now described. In each of the following Examples, maximum and minimum values in molecular weight distribution were measured by GPC, under conditions of a column temperature of 40° C., a solvent of tetrahydrofuran, a flow rate of 1 mm/min., sample concentration of 0.2 percent by weight and a sample quantity of 100 $\mu$l, with two columns of KF-80M and a column of KF-802.5 (by SHODEX Co. Ltd.).

EXAMPLE 3-1

5 parts of an ethylene-vinyl acetate copolymer having a saponification value of 28, a softening point of 150° C. and a maximum value of 150000 in molecular weight distribution and 50 parts of toluene were introduced into a flask, and dissolved. Gaseous nitrogen was substituted for the air in the flask, and the solution contained in this flask was heated to the boiling pint of the toluene. When the toluene was refluxed, the solution was stirred and a mixed solution of 70 parts of styrene, 15 parts of methyl methacrylate, 15 parts of n-butyl acrylate and 8 parts of di-t-butyl peroxide (polymerization initiator) was dropped therein for 2.5 hours, to perform solution polymerization.

After termination of the dropping, the mixture was stirred under the reflux of the toluene, and aged for 2 hours. Thereafter the temperature in the flask was gradually increased to 180° C. and the toluene was desolvented under decompression, to obtain a resin composition. The as-obtained resin composition had maximum values at 6500 and 820000 in molecular weight distribution by GPC (when another polymer was prepared in a similar manner with no employment of the ethylene-vinyl acetate copolymer, the as-obtained resin composition exhibited a maximum value of 6000 by GPC). This resin composition was cooled and crushed, to prepare a resin composition for toner.

4 parts of carbon black (MA-100 (trade name) by Mitsubishi Chemical Ltd.) was added to 100 parts of the aforementioned resin composition for toner, melt-blended with the same, and then cooled. Thereafter the mixture was roughly crushed and further finely crushed with a jet mill, to prepare toner powder of 13 to 15 μm in mean particle size.

10 g of the as-obtained toner was measured and introduced into a sample bottle of 100 ml, which in turn was left in a thermostat of 50° C. for 16 hours. Thereafter presence/absence of particle coalescence was observed to evaluate blocking resistance. As the result, excellent blocking resistance was recognized.

The aforementioned toner was applied to an electrophotographic copying machine (modified machine of U-Bix (trade name) by Konica Corporation) and its fixing temperature range was measured. This electrophotographic copying machine was modified to be capable of changing the set temperature of its heating roller for fixing. This set temperature was changed for evaluating the fixing temperature range, in which the toner was fixed to paper in an excellent state with no offset phenomenon. The as-evaluated fixing temperature range was 160° to 240° C. Thus, it was recognized that this toner exhibited excellent fixability over a wide temperature range.

EXAMPLE 3-2

1 part of an ethylene-vinyl acetate copolymer having a saponification value of 28, a softening point of 100° C. and a maximum value of 60000 in molecular weight distribution, 50 parts of toluene and 0.8 parts of t-butyl peroxy 2-ethylhexanoate (polymerization initiator) were introduced into a flask, and dissolved. Gaseous nitrogen was substituted for the air in this flask, and the solution was heated to the boiling point of the toluene. When the toluene was refluxed, the solution was stirred and a mixed solution of 75 parts of styrene, 10 parts of methyl methacrylate and 15 parts of 2-ethylhexyl acrylate was dropped therein for 2.5 hours, to perform solution polymerization.

After termination of the dropping, the mixture was aged, desolvented, cooled and crushed similarly to Example 3-1, to obtain a resin composition for toner. The as-obtained resin composition had maximum values at 72000 and 590000 in molecular weight distribution (when another polymer was prepared in a similar manner with no employment of the ethylene-vinyl acetate copolymer, the as-obtained resin composition had a maximum value of 70000 in molecular weight distribution).

Toner was prepared from the resin composition for toner similarly to Example 3-1, and evaluated also similarly to Example 3-1.

As the result, it was recognized that the toner obtained in Example 3-2 also exhibited excellent blocking resistance and a wide fixing temperature range of 160° to 230° C., with excellent fixability over such a wide temperature range.

EXAMPLE 3-3

3 parts of an ethylene-vinyl acetate copolymer having a saponification value of 12, a softening point of 80° C. and a maximum value of 15000 in molecular weight distribution and 50 parts of toluene were introduced into a flask, and dissolved. Thereafter the solution was treated similarly to Example 3-1. When the toluene was refluxed, the solution was stirred and a mixed solution of 90 parts of styrene, 10 parts of n-butyl acrylate and 5 parts of t-butylcumyl peroxide (polymerization initiator) was dropped therein for 2.5 hours, to perform solution polymerization. After termination of the dropping, a resin composition for toner was obtained in a similar manner to Example 3-1. The as-obtained resin composition for toner had maximum values at 11000 and 380000 in molecular weight distribution (when another polymer was prepared with no employment of the ethylene-vinyl acetate copolymer, the as-obtained resin composition had a maximum value of 9800 in molecular weight distribution). Further, toner was prepared and evaluated also similarly to Example 3-1.

As the result, it was recognized that the toner exhibited excellent blocking resistance and a wide fixing temperature range of 150° to 230° C., with excellent fixability in this temperature range.

EXAMPLE 3-4

4 parts of an ethylene-vinyl acetate copolymer having a saponification value of 28, a softening point of 185° C. and a maximum value of 270000 in molecular weight distribution and 50 parts of toluene were treated in a similar manner to Example 3-1. When the toluene was refluxed, the solution was stirred and a mixed solution of 65 parts of styrene, 15 parts of methyl methacrylate, 20 parts of n-butyl acrylate and 3 parts of di-t-butyl peroxide (polymerization initiator) was dropped therein for 2.5 hours, to perform solution polymerization. Then a resin composition was obtained similarly to Example 3-1. The as-obtained resin composition had maximum values at 20000 and 1540000 in molecular weight distribution (when another polymer was prepared in a similar manner with no employment of the ethylene-vinyl acetate copolymer, the as-obtained resin composition had a maximum value of 21000 in molecular weight distribution). Toner was prepared from the as-obtained resin composition and evaluated in a similar manner to Example 3-1.

As the result, it was recognized that the toner exhibited excellent blocking resistance and a wide fixing temperature range of 170° to 240° C., with excellent fixability in this temperature range.

EXAMPLE 3-5

9 parts of an ethylene-vinyl acetate copolymer having a saponification value of 25, a softening point of 135° C. and a maximum value of 100000 in molecular weight distribution and 50 parts of toluene were treated in a similar manner to Example 3-1. When the toluene was refluxed, the solution was stirred and a mixed solution of 80 parts of styrene, 10 parts of methyl methacrylate, 10 parts of n-butyl acrylate and 2 parts of benzoyl peroxide (polymerization initiator) was dropped therein for 2.5 hours to perform solution polymerization. Thereafter a resin composition for toner was obtained similarly to Example 3-1. The as-obtained resin composition had maximum values at 30000 and 650000 in molecular weight distribution (when another polymer was prepared in a similar manner with no employment of the ethylene-vinyl acetate copolymer, the as-obtained resin composition had a maximum value of 30000 in molecular weight distribution). Toner was prepared from the resin composition for toner and evaluated similarly to Example 3-1.

As the result, it was recognized that the toner exhibited excellent blocking resistance and a wide fixing temperature range of 160° to 230° C., with excellent fixability in this temperature range.

EXAMPLE 3-6

In this Example, a bridged polymer was prepared by graft polymerization under presence of a polyvalent metal compound, to be employed as a resin composition for toner.

9 parts of an ethylene-vinyl acetate copolymer having a saponification value of 25, a softening point of 135° C. and a maximum value of 100000 in molecular weight distribution, 50 parts of toluene and 0.7 parts of zinc oxide were introduced into a flask, and dissolved. Gaseous nitrogen was substituted for the air in this flask, and the solution was heated to the boiling point of the toluene. When the toluene was refluxed, the solution was stirred and a mixed solution of 75 parts of styrene, 10 parts of methyl methacrylate, 10 parts of n-butyl acrylate, 5 parts of monomethacryloyloxyethylester succinate and 2 parts of benzoyl peroxide (polymerization initiator) was dropped therein for 2.5 hours, to perform solution polymerization. Thereafter the mixture was aged, cooled and crushed similarly to Example 3-1. This resin composition had maximum values at 33000 and 700000 in molecular weight distribution by GPC (when another polymer was prepared in a similar manner with no employment of the ethylene-vinyl acetate copolymer, the as-obtained resin composition had a maximum value of 33000 in molecular weight distribution by GPC). This resin composition was melt-blended with carbon black, and roughly and finely crushed to prepare toner powder, which was then evaluated.

As the result, it was recognized that the as-obtained toner exhibited excellent blocking resistance and a wide fixing temperature range of 160° to 240° C., with excellent fixability in this temperature range.

Comparative Example 3-1

A resin composition for toner was prepared absolutely in a similar manner to Example 3-1, except that 8 parts of azobisisobutylonitrile was employed as a polymerization initiator in place of 8 parts of di-t-butyl peroxide. This resin composition had maximum values at 5500 and 150000 in molecular weight distribution by GPC (when another polymer was prepared in a similar manner with no employment of the ethylene-vinyl acetate copolymer, the as-obtained resin composition had a maximum value at 5500 in molecular weight distribution by GPC). This resin composition was melt-blended with carbon black similarly to Example 3-1, and roughly and finely crushed to prepare toner powder, which was then evaluated. As the result, it was recognized that this toner was inferior to that of Example 3-1 with a narrow fixing temperature range of 160° to 220° C., although excellent blocking resistance was attained.

Comparative Example 3-2

Toner powder was prepared absolutely in a similar manner to Example 3-1 except that the amount of the ethylene-vinyl acetate copolymer was increased to 20 parts, and subjected to evaluation.

As the result, the as-obtained toner exhibited particle coalescence with inferior blocking resistance. Further, this toner was inferior to that of Example 3-1 with a narrow fixing temperature range of 160° to 200° C.

Comparative Example 3-3

Toner powder was prepared absolutely in a similar manner to Example 3-3 except that an ethylene-vinyl acetate copolymer having a saponification value of 40 and a softening point of 220° C. was employed, and subjected to evaluation.

As the result, the as-obtained toner exhibited particle coalescence, with inferior blocking resistance. Further, the fixing temperature range of this toner was 180° to 230° C. Namely, the lower limit fixing temperature was too high although the upper limit fixing temperature (minimum temperature causing an offset phenomenon) was satisfactory. Thus, Comparative Example 3-3 was recognized to be inferior to Example 3-3.

Comparative Example 3-4

A resin composition for toner was prepared absolutely in a similar manner to Example 3-4, except that an ethylene-vinyl acetate copolymer had a maximum value of 450000 in molecular weight distribution by GPC. This resin composition had maximum values at 21000 and 2500000 in molecular weight distribution by GPC. The resin composition was melt-blended with carbon black and roughly and finely crushed to prepare toner powder similarly to Example 3-4, and the toner was evaluated.

Although this toner had excellent blocking resistance, its fixing temperature range was 180° to 240° C. Namely, the lower limit fixing temperature was too high although the upper limit fixing temperature was satisfactory. Thus, Comparative Example 3-4 was recognized to be inferior to Example 3-4.

Comparative Example 3-5

A resin composition for toner was prepared absolutely in a similar manner to Example 3-2, except that 0.5 parts of t-butyl peroxy 2-ethyl hexanoate was employed for serving as a polymerization initiator. This resin composition had maximum values at 100000 and 590000 in molecular weight distribution by GPC (when another polymer was prepared in a similar manner with no employment of the ethylene-vinyl copolymer, the as-obtained resin composition had a maximum value at 98000 in molecular weight distribution by GPC). This resin composition was melt-blended with carbon black and roughly and finely crushed to prepare toner powder similarly to Example 3-2, and the toner was evaluated. Although this toner had excellent blocking resistance, the lower limit fixing temperature was too high despite a sufficient upper limit fixing temperature in a fixing temperature range of 180° to 240° C. Thus, Comparative Example 3-5 was inferior to Example 3-2.

Examples according to the fourth aspect of the present invention are now described.

EXAMPLE 4-1

4 parts of an ethylene-vinyl acetate copolymer having a saponification value of 28 and a softening point of 135° C. and 50 parts of toluene were introduced into a flask, and dissolved. Gaseous nitrogen was substituted for the air in the flask, and the solution contained in this flask was heated to the boiling point of the toluene. When the toluene was refluxed, the solution was stirred and a mixed solution of 70 parts of styrene, 15 parts of methyl methacrylate, 15 parts of n-butyl acrylate and 6 parts of di-t-butyl peroxide (polymerization initiator) was dropped therein for 2.5 hours, to perform solution polymerization.

After termination of the dropping, the mixture was stirred under the reflux of the toluene, and aged for 2 hours. Thereafter the temperature in the flask was gradually increased to 180° C., and the toluene was desolvented under decompression to obtain a resin composition. The as-obtained resin composition had maximum values at 8200 and 580000 in molecular weight distribution by GPC, with a minimum value of 41000 therebetween. This resin composition was separated into two parts of a low molecular weight side and a high molecular weight side along the molecular weight of 41000 and sampled by GPC. In the sampled parts of the resin composition, contents of the ethylene-vinyl acetate copolymer were calculated. Vinyl copolymers of the same composition were separately polymerized and decomposed into monomer compositions by pyrolytic gas chromatography (PGC), and then peak heights thereof were measured respectively. The respective peak heights were regarded as 100, to calculate ratios of respective monomer peak heights of the resin composition obtained by PGC. The calculated ratios, i.e., reduction ratios, were regarded as contents of the ethylene-vinyl acetate copolymer. 1 mg of each sample was thermally decomposed at a pyrolytic temperature of 400° C. with a filler of polyethylene glycol and held at a column temperature of 100° C., and after 15 minutes its temperature was increased to 150° C. at a programming rate of 10° C./min. A carrier gas was prepared from gaseous nitrogen. As the result, the part on the low molecular weight side exhibited an ethylene-vinyl acetate copolymer content of less than 5 percent by weight and the part on the high molecular weight side exhibited that of 20 percent by weight.

The resin composition obtained in the aforementioned manner was cooled and then crushed, to prepare a resin composition for toner. 4 parts of carbon black (MA-100 (trade name) by Mitsubishi Chemical Ltd.) was added to 100 parts of this resin composition for toner and melt-blended with the same. This mixture was cooled, roughly crushed and then finely crushed with a jet mill, to prepare toner powder of 13 to 15 μm in mean particle size.

10 mg of the as-obtained toner was measured and introduced into a sample bottle of 100 ml, which in turn was left in a thermostat of 50° C. for 16 hours. Thereafter presence/absence of particle coalescence was observed to evaluate blocking resistance. As the result, it was recognized that excellent blocking resistance was attained.

The aforementioned toner was applied to an electrophotographic copying machine (modified machine of U-Bix (trade name) by Konica Corporation) and its fixing temperature range was measured. This electrophotographic copying machine was modified to be capable of changing the set temperature of its heating roller for fixing. This set temperature was changed for evaluating the fixing temperature range, in which the toner was fixed to paper in an excellent state with no offset phenomenon. The as-evaluated fixing temperature range was 160° to 240° C. Thus, it was confirmed that this toner exhibited excellent fixability over a wide temperature range.

EXAMPLE 4-2

1 part of an ethylene-vinyl acetate copolymer having a saponification value of 28 and a softening point of 100° C., 50 parts of toluene and 1 part of t-butylcumyl peroxide (polymerization initiator) were introduced into a flask, and dissolved. Gaseous nitrogen was substituted for the air in this flask, and the solution was heated to the boiling point of the toluene. When the toluene was refluxed, the solution was stirred and a mixed solution of 80 parts of styrene and 20 parts of 2-ethylhexyl acrylate was dropped therein for 2.5 hours, to perform solution polymerization.

After termination of the dropping, the mixture was aged, desolvented, cooled and crushed to obtain a resin composition for toner, similarly to Example 4-1. The as-obtained resin composition had maximum values at 66000 and 870000 in molecular weight distribution, with a minimum value of 280000 therebetween. Contents of the ethylene-vinyl acetate copolymer were calculated on low and high molecular weight sides in a similar manner to Example 4-1, whereby a content of less than 5 percent by weight and that of 10 percent by weight were obtained on low and high molecular weight sides respectively.

Toner was prepared from this resin composition for toner similarly to Example 4-1, and subjected to evaluation also similarly to Example 4-1.

As the result, it was confirmed that the toner obtained in Example 4-2 also exhibited excellent blocking resistance and a wide fixing temperature range of 170° to 240° C., with excellent fixability over such a wide temperature range.

EXAMPLE 4-3

3 parts of an ethylene-vinyl acetate copolymer having a saponification value of 12 and a softening point of 80° C. and 50 parts of toluene were introduced into a flask, and dissolved. Thereafter the solution was treated similarly to Example 4-1. When the toluene was refluxed, the solution was stirred and a mixed solution of 90 parts of styrene, 10 parts of n-butyl acrylate and 9 parts of t-butyl peroxy 2-ethyl hexanoate (polymerization initiator) was dropped therein for 2.5 hours, to perform solution polymerization. After termination of the dropping, a resin composition for toner was obtained similarly to Example 4-1.

The as-obtained resin composition for toner had maximum values at 5500 and 380000 in molecular weight distribution, with a minimum value of 33000 therebetween. Contents of the ethylene-vinyl acetate copolymer were calculated on low and high molecular weight sides similarly to Example 4-1, whereby a content of less than 5 percent by weight and that of 6 percent by weight were obtained on the low and high molecular weight sides respectively. Further, toner was prepared similarly to Example 4-1, and subjected to evaluation.

As the result, it was confirmed that this toner exhibited excellent blocking resistance and a wide fixing temperature range of 160° to 230° C., with excellent fixability in this temperature range.

EXAMPLE 4-4

5 parts of an ethylene-vinyl acetate copolymer having a saponification value of 28 and a softening point of 185° C. and 50 parts of toluene were treated similarly to Example 4-1. When the toluene was refluxed, the solution was stirred and a mixed solution of 65 parts of styrene, 15 parts of methyl methacrylate, 20 parts of n-butyl acrylate and 4 parts of di-t-butyl peroxide (polymerization initiator) was dropped therein for 2.5 hours, to perform solution polymerization. After termination of the dropping, a resin composition for toner was obtained similarly to Example 4-1. The as-obtained resin composition had maximum values at 10500 and 1610000 in molecular weight distribution, with a minimum value of 120000 therebetween. Contents of the ethylene-vinyl acetate copolymer were calculated on low and high molecular weight sides similarly to Example 4-1, whereby a content of less than 5 percent by weight and that of 70 percent by weight were obtained on low and high molecular weight sides respectively. Toner was prepared from this resin composition similarly to Example 4-1, and subjected to evaluation.

As the result, it was confirmed that the as-obtained toner exhibited excellent blocking resistance and a wide fixing temperature range of 170° to 240° C., with excellent fixability in this temperature range.

EXAMPLE 4-5

9 parts of an ethylene-vinyl acetate copolymer having a saponification value of 25 and a softening point of 150° C. and 50 parts of toluene were treated similarly to Example 4-1. When the toluene was refluxed, the solution was stirred and a mixed solution of 75 parts of styrene, 5 parts of methyl methacrylate, 20 parts of 2-ethylhexyl acrylate and 5 parts of benzoyl peroxide (polymerization initiator) was dropped therein for 2.5 hours, to perform solution polymerization. Thereafter a resin composition for toner was obtained in a similar manner to Example 4-1. The as-obtained resin composition had maximum values at 7800 and 800000 in molecular weight distribution, with a minimum value at a position of 63000 in molecular weight therebetween. This resin composition had an ethylene-vinyl acetate copolymer content of less than 5 percent by weight on a low molecular side, and that of 80 percent by weight on a high molecular weight side. Toner was prepared from the resin composition similarly to Example 4-1, and subjected to evaluation.

As the result, it was confirmed that the as-obtained toner exhibited excellent blocking resistance and a wide fixing temperature range of 160° to 240° C., with excellent fixability in this temperature range.

EXAMPLE 4-6

In this Example, a bridged polymer was prepared by graft polymerization under presence of a polyvalent metal compound, to be employed as a resin composition for toner.

3 parts of an ethylene-vinyl acetate copolymer having a saponification value of 12 and a softening point of 80° C., 50 parts of toluene and 0.5 parts of magnesium oxide were introduced into a flask, and dissolved. Gaseous nitrogen was substituted for the air in this flask, and the solution was heated to the boiling point of the toluene. When the toluene was refluxed, the solution was stirred and a mixed solution of 86 parts of styrene, 10 parts of n-butyl acrylate, 4 parts of acrylic acid and 9 parts of t-butyl peroxy 2-ethylhexanoate (polymerization initiator) was dropped therein for 2.5 hours, to perform solution polymerization. After termination of the dropping, the as-obtained polymer was aged, cooled and crushed similarly to Example 4-1. The as-obtained resin composition had maximum values at 5800 and 410000 in molecular weight distribution by GPC, with a minimum value of 40000 therebetween. Further, the resin composition had an ethylene-vinyl acetate copolymer content of less than 5 percent by weight and that of 6 percent by weight on low and high molecular weight sides respectively. This resin composition was melt-blended with carbon black and roughly and finely crushed to prepare toner powder, which was then evaluated.

As the result, it was recognized that the as-obtained toner exhibited excellent blocking resistance and a wide fixing temperature range of 160° to 240° C., with excellent fixability in this temperature range.

Comparative Example 4-1

A resin composition for toner was prepared absolutely in a similar manner to Example 4-1, except that 6 parts of azobisisobutylonitrile was employed as a polymerization initiator in place of 6 parts of di-t-butyl peroxide. This resin composition had maximum values at 8000 and 120000 in molecular weight distribution by GPC. The resin composition was melt-blended with carbon black and roughly and finely crushed to prepare toner powder, and this toner was evaluated, similarly to Example 4-1.

As the result, it was confirmed that this resin composition was inferior to that of Example 4-1 with a narrow fixing temperature range of 160° to 220° C., although excellent blocking resistance was attained.

Comparative Example 4-2

A resin composition for toner was prepared absolutely in a similar manner to Example 4-2, except that 0.5 parts of t-butylcumyl peroxide was employed as a polymerization initiator. This resin composition had maximum values at 95000 and 870000 in molecular weight distribution by GPC, with a minimum value of 350000 therebetween. Further, the resin composition had an ethylene-vinyl acetate copolymer content of less than 5 percent by weight and that of 15 percent by weight on low and high molecular weight sides respectively.

Toner powder was prepared from the resin composition similarly to Example 4-2, and subjected to evaluation also similarly to Example 4-2. As the result, this resin composition was inferior to that of Example 4-2 with an excessively high lower limit fixing temperature in a fixing temperature range of 180° to 240° C., although excellent blocking resistance and a satisfactory upper limit fixing temperature were attained.

Comparative Example 4-3

A resin composition for toner was prepared absolutely in a similar manner to Example 4-4, except that an ethylene-vinyl acetate copolymer having a saponification value of 40 and a softening point of 220° C. was employed. This resin composition had maximum values at 11000 and 2500000 in molecular weight distribution by GPC, with a minimum value of 200000 therebetween. Further, the resin composition had an ethylene-vinyl acetate copolymer content of less than 5 percent by weight and that of 85 percent by weight on low and high molecular weight sides respectively.

Toner powder was prepared from this resin composition in a similar manner to Example 4-4, and subjected to evaluation also similarly to Example 4-4.

As the result, this toner had a wide fixing temperature range of 170° to 240° C., and hence it was possible to fix this toner in an excellent state over a wide temperature range. However, this toner exhibited particle coalescence with inferior blocking resistance. Thus, this resin composition was inferior to that of Example 4-4.

Comparative Example 4-4

A resin composition for toner was prepared absolutely in a similar manner to Example 4-5, except that an ethylene-vinyl acetate copolymer having a saponification value of 5 and a softening point of 60° C. was employed. This resin composition had maximum values at 8000 and 400000 in molecular weight distribution by GPC, with a minimum value of 38000 therebetween.

Further, the resin composition had an ethylene-vinyl acetate copolymer content of 10 percent by weight and that of 5 percent by weight on low and high molecular weight sides respectively.

Toner powder was prepared from the as-obtained resin composition similarly to Example 4-5, and subjected to evaluation.

As the result, this toner exhibited particle coalescence with inferior blocking resistance, and a narrow fixing temperature range of 160° to 220° C. Thus, this resin composition was recognized to be inferior to that of Example 4-5.

What is claimed is:

1. A toner composition for developing an electrostatic charge image comprising a colorant and a graft polymer composition wherein said graft polymer is prepared from:
    (a) 90 to 99.9 percent by weight of a copolymer formed by copolymerizing a styrene monomer and (meth)acrylic ester to contain at least 50 percent by weight of said styrene monomer, said copolymer having a maximum value of molecular weight distribution within the range of about $4 \times 10^3$ to about $8 \times 10^4$ measured by gel permeation chromatography; and
    (b) 0.1 to 10 percent by weight of an ethylene-vinyl acetate copolymer having a maximum value of molecular weight distribution within the range of about $5 \times 10^3$ to about $3 \times 10^5$ measured by gel permeation chromatography and having a saponification value of 10 to 30 and a softening point of 70° to 200° C.,
    said graft polymer having maximum values of molecular weight distributions of between about $4 \times 10^3$ and about $8 \times 10^4$ and between about $3 \times 10^5$ and about $2 \times 10^6$ measured by gel permeation chromatography.

2. A toner composition according to claim 1, wherein said graft polymer has maximum values at least in ranges of at least $4 \times 10^3$ and less than $8 \times 10^4$ and at least $3 \times 10^5$ and less than $2 \times 10^6$ in molecular weight distribution measured by gel permeation chromatography, said ethylene-vinyl acetate copolymer having a higher content on a high molecular weight side when said graft polymer composition is divided into low molecular weight side and a high molecular weight side along a boundary of the molecular weight of a minimum value being present between said maximum values.

3. A toner composition according to claim 1, wherein said copolymer (a) further contains a vinyl monomer having an acidic group as a constituent, said graft polymer composition having a bridge polymer obtained by bridging said copolymer (a) by a polyvalent metal compound (c) so that the acidic group of said vinyl monomer remains unreacted.

4. A toner composition according to claim 3, wherein said polyvalent metal compound (c) is a metal oxide.

5. A toner composition for developing an electrostatic charge image comprising a colorant and a graft polymer composition wherein said graft polymer is prepared from:
    (a) 85 to 99.9 percent by weight of a copolymer formed by copolymerizing a styrene monomer and (meth) acrylic ester to contain at least 50 percent by weight of said styrene monomer; and
    (b) 0.1 to 10 percent by weight of an ethylene-vinyl acetate copolymer having a saponification value of 10 to 30 and a softening point of 70° to 200° C.,
    said copolymers being graft-polymerized in the presence of:
    (c) 0.01 to 5 percent by weight of a polyvalent metal compound.

6. A toner composition being mainly composed of a resin composition for toner in accordance with claim 5 and a colorant.

7. A toner composition according to claim 5, wherein said copolymer (a) has a maximum value of at least $4 \times 10^3$ and less than $8 \times 10^4$ in molecular weight distribution measured by gel permeation chromatography and said ethylene-vinyl acetate copolymer (b) has a maximum value of at least $5 \times 10^3$ and less than $3 \times 10^5$ in molecular weight distribution measured by gel permeation chromatography, said graft polymer having maximum values at least in ranges of at least $4 \times 10^3$ and less than $8 \times 10^4$ and at least $3 \times 10^5$ and less than $2 \times 10^6$ in molecular weight distribution measured by gel permeation chromatography.

8. A toner composition according to claim 5, wherein said graft polymer has maximum values at least in ranges of at least $4 \times 10^3$ and less than $8 \times 10^4$ and at least $3 \times 10^5$ and less than $2 \times 10^6$ in molecular weight distribution measured by gel permeation chromatography, said ethylene-vinyl acetate copolymer having a higher content on a high molecular weight side when said graft polymer composition is divided into a low molecular weight side and a high molecular weight side along a boundary of the molecular weight of a minimum value being present between said maximum values.

9. A toner composition according to claim 5, wherein said copolymer (a) further contains a vinyl monomer having an acidic group as a constituent, said polymer composition being a bridged polymer obtained by bridging said copolymer (a) by a polyvalent metal compound (c) so as to remain unreacted said acidic group of said vinyl monomer.

10. A toner composition according to claim 5, wherein said polyvalent metal compound (c) is a metal oxide.

11. The toner composition of claim 1, wherein said graft polymer composition is prepared in the presence of a peroxide polymerization initiator.

* * * * *